(12) United States Patent
Doertoluk et al.

(10) Patent No.: US 10,145,463 B2
(45) Date of Patent: Dec. 4, 2018

(54) COOLING AND LUBRICATING DEVICE AND METHOD FOR COOLING AND/OR LUBRICATING A TRANSMISSION FOR A WIND TURBINE

(71) Applicant: Robert Bosch GmbH, Stuttgart (DE)

(72) Inventors: Ibrahim Doertoluk, Krombach (DE); Udo Froehlich, Rothenfels (DE); Bernd Schnurr, Lohr-Sendelbah (DE); Detlef Boehm, Bochum (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 15/031,302

(22) PCT Filed: Sep. 12, 2014

(86) PCT No.: PCT/EP2014/069465
§ 371 (c)(1),
(2) Date: Jul. 5, 2016

(87) PCT Pub. No.: WO2015/058899
PCT Pub. Date: Apr. 30, 2015

(65) Prior Publication Data
US 2016/0305538 A1  Oct. 20, 2016

(30) Foreign Application Priority Data

Oct. 25, 2013  (DE) .......... 10 2013 221 742
Nov. 28, 2013  (DE) .......... 10 2013 224 339

(51) Int. Cl.
*F16H 57/04* (2010.01)
*F03D 80/70* (2016.01)
(Continued)

(52) U.S. Cl.
CPC ......... *F16H 57/0442* (2013.01); *F03D 15/00* (2016.05); *F03D 80/70* (2016.05);
(Continued)

(58) Field of Classification Search
CPC ............. F16H 57/0439; F16H 57/0512; F16H 57/0442; F15B 1/022
(Continued)

(56) References Cited

U.S. PATENT DOCUMENTS 4,105,093 A   8/1978 Dickinson

FOREIGN PATENT DOCUMENTS

DE  20 2008 001 828 U1  6/2008
WO  2009/147147 A2  12/2009

*Primary Examiner* — Thomas E Lazo
*Assistant Examiner* — Daniel Collins
(74) *Attorney, Agent, or Firm* — Maginot, Moore & Beck LLP (57) ABSTRACT

A cooling and lubricating device for a transmission for a wind turbine includes a transmission oil tank for storing transmission oil for the transmission, a transmission oil line system for carrying the transmission oil between the transmission oil tank and the transmission, a hydraulic oil tank for storing hydraulic oil, a hydraulic oil line system for carrying the hydraulic oil, a hydraulic oil conveying device for conveying the hydraulic oil through the hydraulic oil line system, an energy accumulator for at least temporarily maintaining a pressure within the hydraulic oil line system, the energy accumulator chargeable using the hydraulic oil conveyed by the hydraulic oil conveying device; and a transmission oil conveying device coupled to the hydraulic oil line system and to the transmission oil line system and configured to be driven by the hydraulic oil in order to convey the transmission oil to the transmission.

13 Claims, 11 Drawing Sheets

(51) Int. Cl.
  *F03D 15/00* (2016.01)
  *F15B 1/02* (2006.01)
  *F15B 1/027* (2006.01)

(52) U.S. Cl.
  CPC .............. *F15B 1/022* (2013.01); *F15B 1/027* (2013.01); *F16H 57/0412* (2013.01); *F16H 57/0441* (2013.01); *F16H 57/0446* (2013.01); *F16H 57/0447* (2013.01); *F16N 2260/20* (2013.01); *Y02E 10/722* (2013.01)

(58) Field of Classification Search
  USPC .......................................................... 60/413
  See application file for complete search history.

COOLING AND LUBRICATING DEVICE AND METHOD FOR COOLING AND/OR LUBRICATING A TRANSMISSION FOR A WIND TURBINE

This application is a 35 U.S.C. § 371 National Stage Application of PCT/EP2014/069465, filed on Sep. 12, 2014, which claims the benefit of priority to (i) patent application no. DE 10 2013 221 742.0, filed on Oct. 25, 2013 in Germany, and (ii) patent application no. DE 10 2013 224 339.1, filed on Nov. 28, 2013 in Germany, the disclosures of which are incorporated herein by reference in their entirety.

The present disclosure relates to a cooling lubrication device and to a method for cooling and/or lubricating a transmission for a wind turbine.

To enable a transmission, for example of a wind turbine, to be supplied with lubricating oil, a direct pump drive may be used, by means of a purely electrical or electrical/mechanical drive. An emergency function (=implementation of a wet sump) can be realized by means of geodetic pressure of a gravity tank.

Gravity tank: expensive, large and heavy, large quantity of oil, which is expensive. Direct pump drive with an electric motor is suitable only for battery-backed emergency operation.

It is the object of the present disclosure to create to an improved cooling lubrication device and a improved method for cooling and/or lubricating a transmission for a wind turbine.

This object is achieved by a cooling lubrication device and a method for cooling and/or lubricating a transmission for a wind turbine according to the principal claims.

The described approach renders possible a 2-circuit hydraulic system for cooling lubrication systems, for example of wind turbines. In this case, a purely electrical drive and an emergency system for the implementation of a wet sump can be realized in the transmission, for example of wind turbines.

The described approach can be used, in particular, for cooling lubrication systems of wind turbines.

Advantageously in this case, it is possible to use standard hydraulic components. In addition, it is suitable for an emergency drive concept. Advantageously, it is possible to realize an emergency drive concept by means of standard hydraulic components for an electrical pump drive.

A cooling lubrication device for a transmission for a wind turbine has the following features:

a transmission oil tank for storing transmission oil for the transmission;

a transmission oil line system for carrying the transmission oil between the transmission oil tank and the transmission;

a hydraulic oil tank for storing hydraulic oil;

a hydraulic oil line system for carrying the hydraulic oil;

a hydraulic oil conveying means for conveying the hydraulic oil through the hydraulic oil line system;

an energy accumulator for maintaining, at least temporarily, a pressure within the hydraulic oil line system, wherein the energy accumulator is chargeable by means of hydraulic oil conveyed by the hydraulic oil conveying means; and a transmission oil conveying means, which is coupled to the hydraulic oil line system and the transmission oil line system, which is designed to be driven by means of the hydraulic oil for the purpose of conveying the transmission oil to the transmission.

The transmission oil tank, the transmission and the transmission oil line system may be part of a transmission oil circuit. The transmission oil line system may have a plurality of fluid lines. The hydraulic oil tank, the hydraulic oil line system, the hydraulic oil conveying means and the energy accumulator may be part of a hydraulic oil circuit. The hydraulic oil line system may have a plurality of fluid lines.

Hydraulic oil connections of the transmission oil conveying means may be connected to the hydraulic oil line system, such that, for example, a hydraulic motor of the transmission oil conveying means may be disposed in the hydraulic oil circuit. Transmission oil connections of the transmission oil conveying means may be connected to the transmission oil line system, such that, for example, a transmission oil pump of the transmission oil conveying means may be part of the transmission oil circuit. The hydraulic oil circuit and the transmission oil circuit may be realized as separate circuits that are fluidically separated from each other. At least one switching element disposed within the transmission oil circuit, for example a valve, may be actuated by means of the hydraulic oil circuit.

The energy accumulator may be realized, for example, as a hydraulic accumulator or pressure accumulator.

Such a two-circuit hydraulic system may have an indirect drive for the transmission oil pumps. For example, a hydropneumatic energy accumulator may be used as an energy accumulator and drive of an emergency system.

According to embodiments, a mechanical pump may be provided inside or outside of a transmission housing of the transmission. The mechanical pump may be coupled to the transmission and ensure the supply of lubricating oil to the bearing locations that are not sufficiently lubricated in wet-sump operating mode.

The described approach can be realized, without a gravity tank and a large quantity of oil, by using standard components. No heating elements are needed, since the drive itself can act as a very efficient heating system, thereby also resulting in shortening of the start-up phase. The technical risk is low.

The described approach enables lubricant to be supplied for dry-sump and wet-sump operation in wind power transmissions. A two-circuit system is proposed, composed of a hydraulic drive part, on the one hand, and of a lubricating oil circuit, on the other hand. According to an embodiment, the lubricating oil circuit has only filters, lubricating oil pumps, a thermovalve and a switchover valve as hydraulically active components. A known lubricating oil hydraulic system does already have these components. However, all drive functions for the lubricating oil pumps, switchover between differing operating modes, emergency operation accumulators, etc. can be realized by means of the hydraulic drive part. This has the advantage that standard hydraulic components can be used for this purpose, and there is no need for modification or new development of components for lubricating oil operation. Moreover, a high-pressure hydraulic accumulator that is compact relative to the volume of transmission oil can be used as an emergency energy source.

The hydraulic oil line system may be designed to drive the transmission oil conveying means, in a normal operating mode, by means of the hydraulic oil conveying means and, in an emergency operating mode, by means of the energy accumulator. The energy accumulator can be used to ensure that the transmission is sufficiently supplied with transmission oil, even in the event of a failure of the hydraulic oil conveying means.

The transmission oil conveying means may comprise a hydraulic motor that can be driven by means of the hydraulic oil, and a transmission oil pump, for conveying the transmission oil, that can be driven by the hydraulic motor. The motor and the pump may be connected to each other via a shaft. In this way, the hydraulic oil circuit and the transmission oil circuit can be coupled to each other.

The transmission oil conveying means may comprise a further hydraulic motor that can be driven by means of the hydraulic oil, and a further transmission oil pump, for conveying the transmission oil, that can be driven by the further hydraulic motor. The transmission oil pump and the further transmission oil pump in this case may be disposed parallel to each other in the transmission oil line system. A positioning means, which is designed to enable, optionally, the hydraulic motor, the further hydraulic motor or both hydraulic motors to be driven by means of the hydraulic oil, may be disposed in the hydraulic oil line system. In this way, differing transmission oil delivery rates can be realized.

The cooling lubrication device may have a blocking means, which is disposed in the transmission oil line system in order to release or block a backflow of the transmission oil from the transmission to the transmission oil tank. In this case, a control input of the blocking means may be coupled to the hydraulic oil line system. If the backflow is blocked, then the transmission can be operated in the wet-sump mode. If the backflow is released, then the transmission can be operated in the dry-sump mode.

The cooling lubrication device may have an overflow means, which is designed to route the transmission oil past the blocking means in order to limit a quantity of the transmission oil present within the transmission. In this way, a quantity of transmission oil present in the transmission in the wet-sump mode is limited.

The hydraulic oil tank and the transmission oil tank may have a common dividing wall. The common dividing wall may have a high thermal conductivity. In this way, on the one hand, the transmission oil can be heated by the hydraulic oil and, on the other hand, the hydraulic oil can be cooled by the transmission oil.

The hydraulic oil tank may be disposed inside the transmission oil tank. In this way, a transfer of heat between the hydraulic oil and the transmission oil can be optimized.

Alternatively, the hydraulic oil tank and the transmission oil tank may be disposed separately from each other. For example, the hydraulic oil tank and the transmission oil tank may be spaced apart from each other. Irrespective of the disposition of the tanks, i.e. whether the tanks are realized separately or together, at least one line of the hydraulic oil line system may be routed through the transmission oil tank. For example, the oil flowing back in the hydraulic circuit may be routed through a coiled tubing through the transmission oil tank. The oil present in the transmission oil tank can consequently be heated by the hydraulic oil.

The cooling lubrication device may have a pressure limiting valve, which is designed to route the hydraulic oil past the energy accumulator when the energy accumulator is full, in order to heat the hydraulic oil. In this way, the hydraulic oil can be heated by means of waste heat generated by the hydraulic oil conveying means. There is no need for an additional heating means.

A method for cooling and/or lubricating a transmission for a wind turbine comprises the following steps:

storing transmission oil for the transmission in a transmission oil tank;

storing hydraulic oil in a hydraulic oil tank; and conveying the transmission oil to the transmission by use of a transmission oil conveying means driven by means of the hydraulic oil.

BRIEF DESCRIPTION OF THE DRAWINGS

The disclosure is explained exemplarily in greater detail in the following, with reference to the appended drawings. There are shown in.

DETAILED DESCRIPTION

Figure 1:
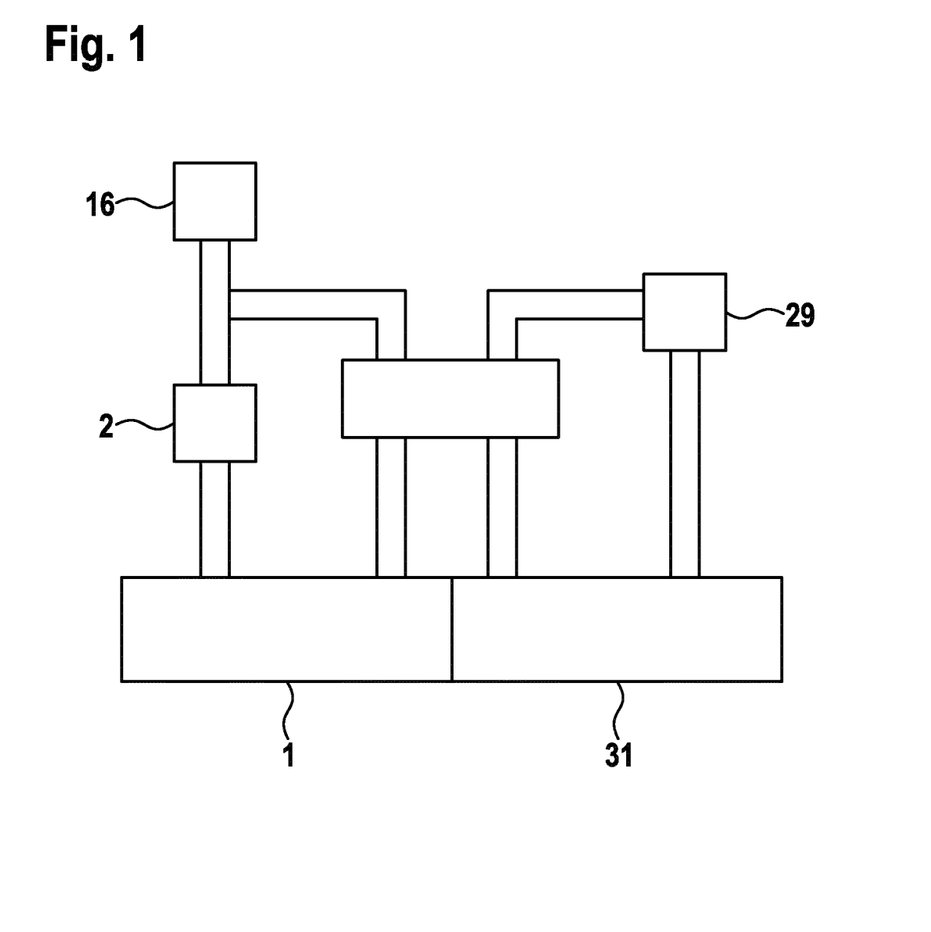
FIG. 1 a schematic representation of a cooling lubrication device.

FIG. 1 shows a schematic representation of a cooling lubrication device according to an exemplary embodiment of the present disclosure. The cooling lubrication device has a hydraulic oil line system and a transmission oil line system. A hydraulic oil tank 1, for storing hydraulic oil, a hydraulic oil conveying means 2, for conveying the hydraulic oil, and a pressure accumulator 16 are connected to each other by lines of the hydraulic oil line system. A transmission oil tank 31, for storing transmission oil, and a transmission 29 are connected to each other via the transmission oil line system. A transmission oil conveying means has interfaces both to the hydraulic oil line system and to the transmission oil line system. The transmission oil conveying means is designed to convey the transmission oil to the transmission 29. For this purpose, the transmission oil conveying means may be driven by means of the hydraulic oil. For example, the transmission oil conveying means may have at least one hydraulic motor, driven by means of the hydraulic oil, and at least one hydraulic pump, for conveying the transmission oil, driven by the hydraulic motor. Depending on the operating mode of the cooling lubrication device, the for conveying the transmission oil by the transmission oil conveying means may be provided either by the pressure accumulator 16 or by the hydraulic oil conveying means 2.

A cooling lubrication device according to exemplary embodiments of the present disclosure is described in the following, with reference to FIGS. 2 to 10, on the basis of an exemplary 2-circuit hydraulic system for cooling lubrication systems of wind turbines.

Figure 2:
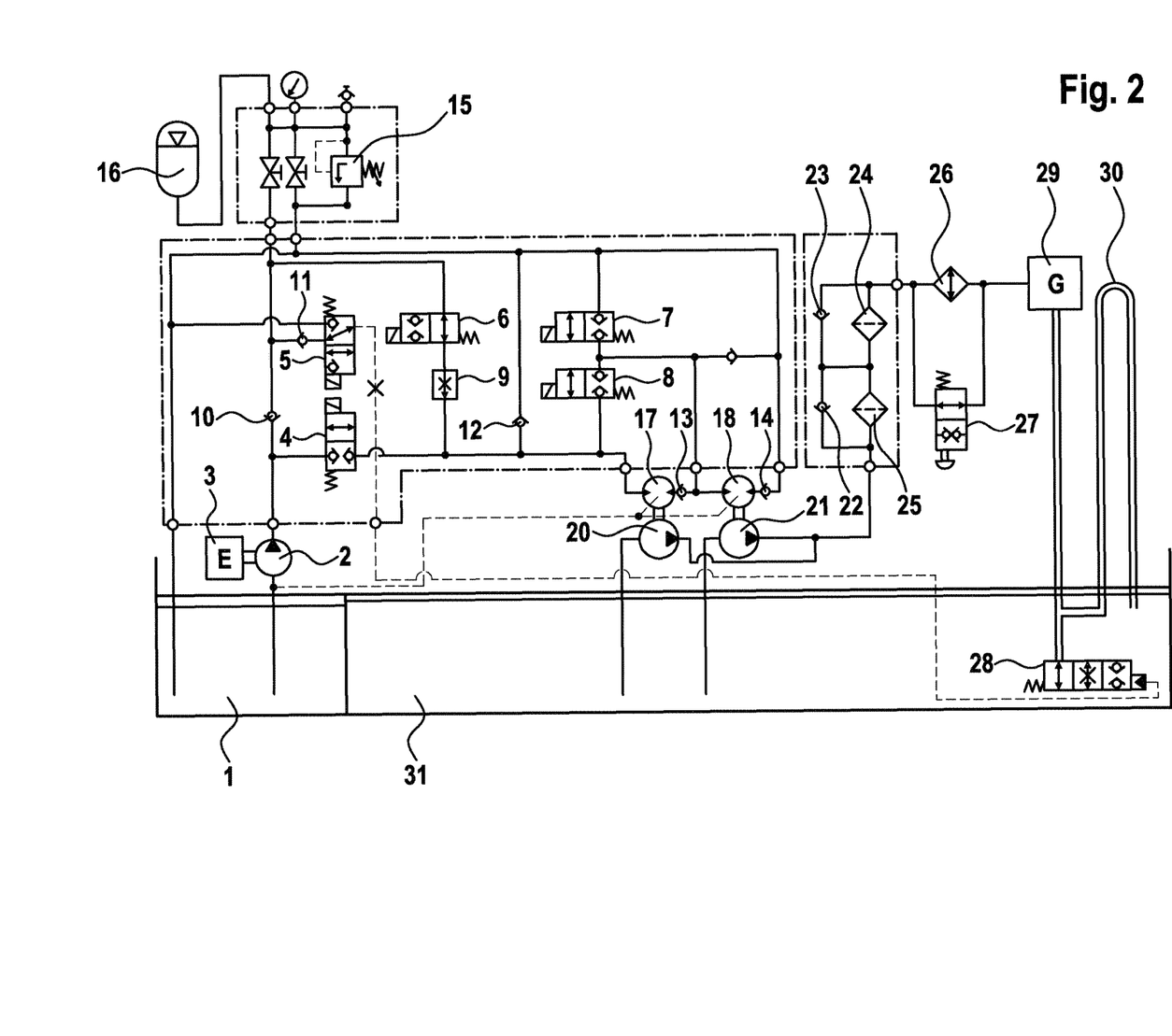
FIGS. 2 to 10 representations of a cooling lubrication device.

FIG. 2 shows the basic structure of the system. The system has a hydraulic oil tank 1, a hydraulic pump 2, an electric motor 3, a 2/2-way valve 4, a 3/2-way valve 5, a 2/2-way valve 6, a 2/2-way valve 7, a 2/2-way valve 8, a flow regulating valve 9, a check valve 10, a check valve 11, a check valve 12, a check valve 13, a check valve 14, a pressure limiting valve 15, a pressure accumulator 16, a hydraulic motor 17, a hydraulic motor 18, a transmission oil pump 20, a transmission oil pump 21, a check valve 22, a check valve 23, a fine filter 24, a coarse filter 25, a cooler 26, a thermovalve 27, a closing valve 28, a transmission 29, a riser pipe with overflow 30, and a transmission oil tank 31.

According to an exemplary embodiment, both tanks 1, 31 are disposed in a housing. For example, the tank 1 may be integrated in the transmission oil tank 31, such that the outer faces of the tank 1 are wetted with as much transmission oil as possible. This ensures that there is a good transfer of heat between the hydraulic oil and the transmission oil.

The hydraulic oil tank 1 is connected to the hydraulic pump 2 via a line. The electric motor 3 is designed to drive the hydraulic pump 2. An output of the hydraulic pump 2 is connected to an input of a 2/2-way valve 4 via lines, to a first input of the 3/2-way valve 5 via the check valves 10, 11, to an input of a 2/2-way valve via the check valve 10, to a connection of the pressure accumulator 16 a 2/2-way valve 7, a 2/2-way valve 8, a shut-off valve, and to an input of the pressure limiting valve 15 via the shut-off valve. An output of the pressure limiting valve 15 is connected to a return line for returning the hydraulic oil into the hydraulic oil tank 1.

An output of the 2/2-way valve 4 is connected to an input of the hydraulic motor 17 and, via the check valve 12, to the return line for returning the hydraulic oil into the hydraulic oil tank 1 and to an input of the a 2/2-way valve 8. An output of the 2/2-way valve 6 is connected to the input of the hydraulic motor 17 via the flow regulating valve 9.

An output of the 2/2-way valve 8 is connected to an input of the 2/2-way valve 7. An output of the 2/2-way valve is connected to the return line.

An output of the hydraulic motor 17 is connected, via the check valve 13, to an input of the hydraulic motor 18, the input of the 2/2-way valve 7 and, via a check valve, to the return line. An output of the hydraulic motor 18 is connected to the return line via the check valve 14.

The hydraulic motor 17 is designed to drive the transmission oil pump 20. The hydraulic motor 18 is designed to drive the transmission oil pump 21. An input of the transmission oil pump 20 is connected to the transmission oil tank 31 via a line, for the purpose of conveying the transmission oil. Correspondingly, an input of the transmission oil pump 21 is connected to the transmission oil tank 31 via a line, for the purpose of conveying the transmission oil.

An output of the transmission oil pump 20 is connected to a transmission oil input of the transmission 29 via a series circuit, composed of a first parallel circuit that is composed of the check valve 22 and the coarse filter 25, and of a second parallel circuit that is composed of the check valve 23 and the fine filter 24, and of the cooler 26. A thermovalve 27 is connected in parallel to the cooler 26.

A transmission oil output of the transmission 29 is connected to an input of the closing valve 28. An output of the closing valve 28 is connected to the transmission oil tank 31, such that the transmission oil can flow back out of the transmission 29, via the closing valve 28, into the transmission oil tank 31. A control input of the closing valve 28 is connected to an output of the 3/2-way valve 5. A second input of the 3/2-way valve 5 is connected to the return line. The transmission oil output of the transmission 29 is additionally connected to the transmission oil tank 31 via the riser pipe having the overflow 30. A height of the overflow 30 defines a maximum fill level of the transmission oil in the transmission 29. Instead of the riser pipe, another suitable means may also be used to limit the fill level of the transmission oil in the transmission 29.

FIG. 2 shows the transmission 29 with a wet sump. The electric motor 3 is in operation.

According to an exemplary embodiment, approximately 50 dm$^3$ of hydraulic oil and approximately 550 dm$^3$ of transmission oil is used.

In the following FIGS. 3 to 10, the volume flows in the cooling lubrication device are represented by arrows. For hydraulic oil, a low-pressure volume flow may be 1 bar, and a high-pressure volume flow may be 160 to 250 bar. For transmission oil, low-pressure volume flow may be 1 bar, and a high-pressure volume flow may be up to 20 bar.

Figure 3:
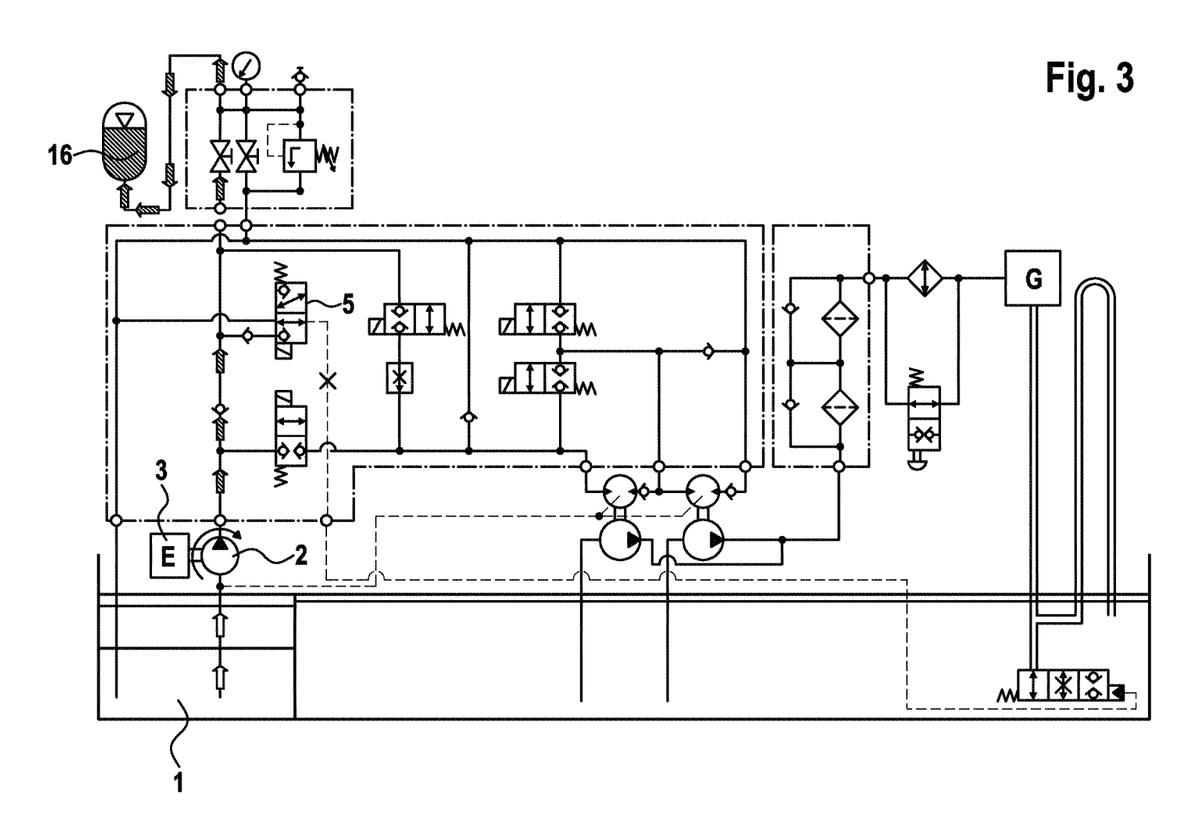

FIG. 3 shows filling-up of the pressure accumulator 16 of the cooling lubrication device, already described with reference to FIG. 2, according to an exemplary embodiment of the present disclosure. For this purpose, the 2/2-way valve 5 has been switched into the position indicated. The electric motor 3 actuates the hydraulic pump 2. The hydraulic pump conveys hydraulic oil into the pressure accumulator 16 and fills up the latter. The oil level in the hydraulic oil tank 1 drops.

Arrows indicate a volume flow of hydraulic oil, driven by the hydraulic pump 2, out of the hydraulic tank 1 into the pressure accumulator 16.

The transmission 29 is in dry-sump mode.

Figure 4:
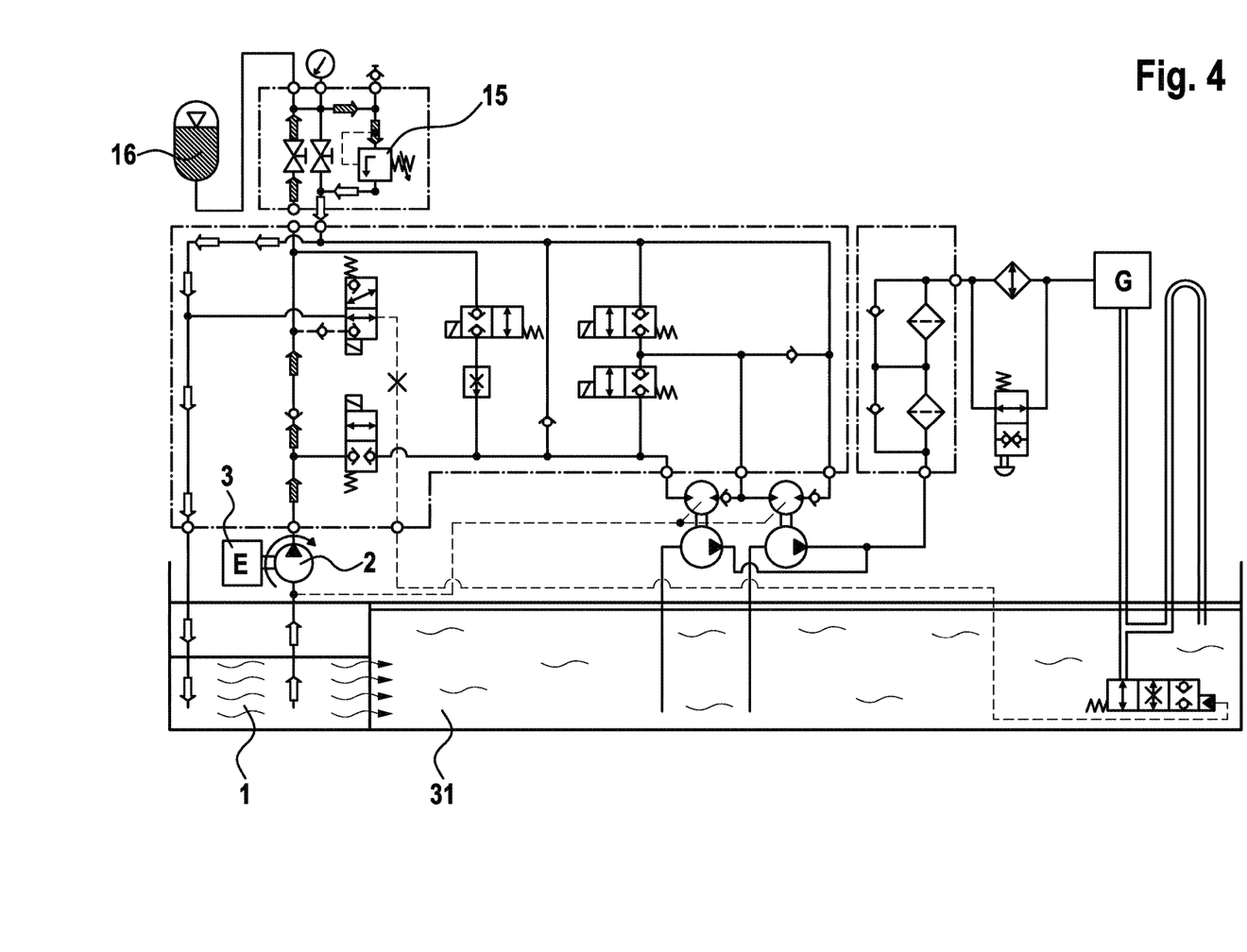

FIG. 4 shows heating of the oil according to an exemplary embodiment of the present disclosure. The arrangement shown may be selected if it is necessary to heat the transmission oil, for example at temperatures of below −20° C. The drive is the same as that shown in FIG. 3. The pressure accumulator 16 is full, the pump 2 continues to convey hydraulic oil, such that the pressure limiting valve 15 opens. The hydraulic oil undergoes compression by the pressure limiting valve 15, and is thereby heated. The heated hydraulic oil flows back into the hydraulic tank 1 and heats the latter. Since the hydraulic tank 1 is disposed in the transmission oil tank 31, the transmission oil also heats up. The heating effect is strong, corresponding to the nominal power of the electric motor 3. There is no need for heating elements in the transmission oil tank 31 or in the hydraulic oil tank 1. The drive benefits from the fact that a low-viscosity hydraulic oil can be used. The latter has acceptable viscosity values even at low temperatures.

The heat of the hydraulic oil is used to heat up the transmission oil via a dividing wall between the tanks 1, 31.

The transmission 29 is in dry-sump mode.

Figure 5:
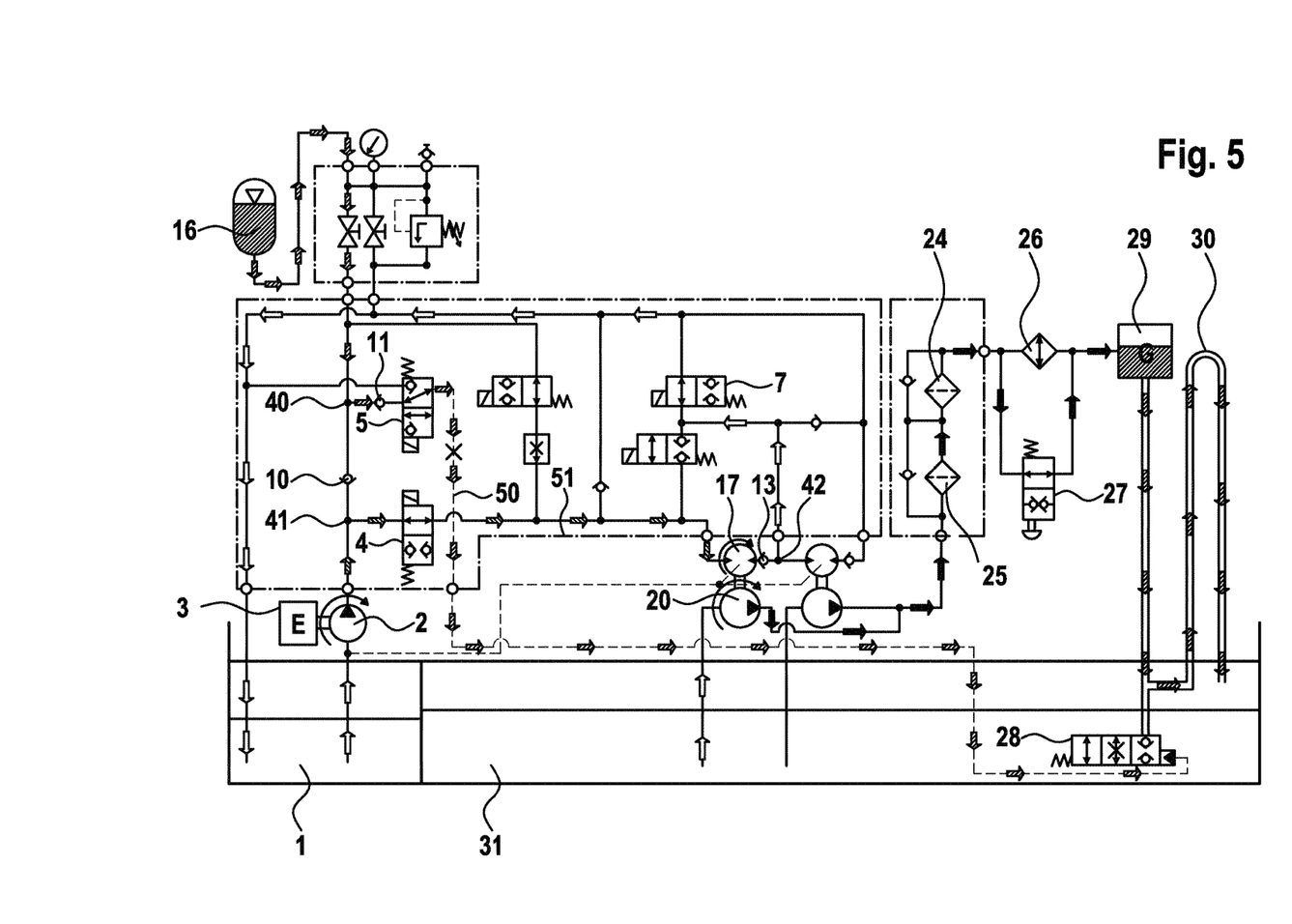
Figure 6:
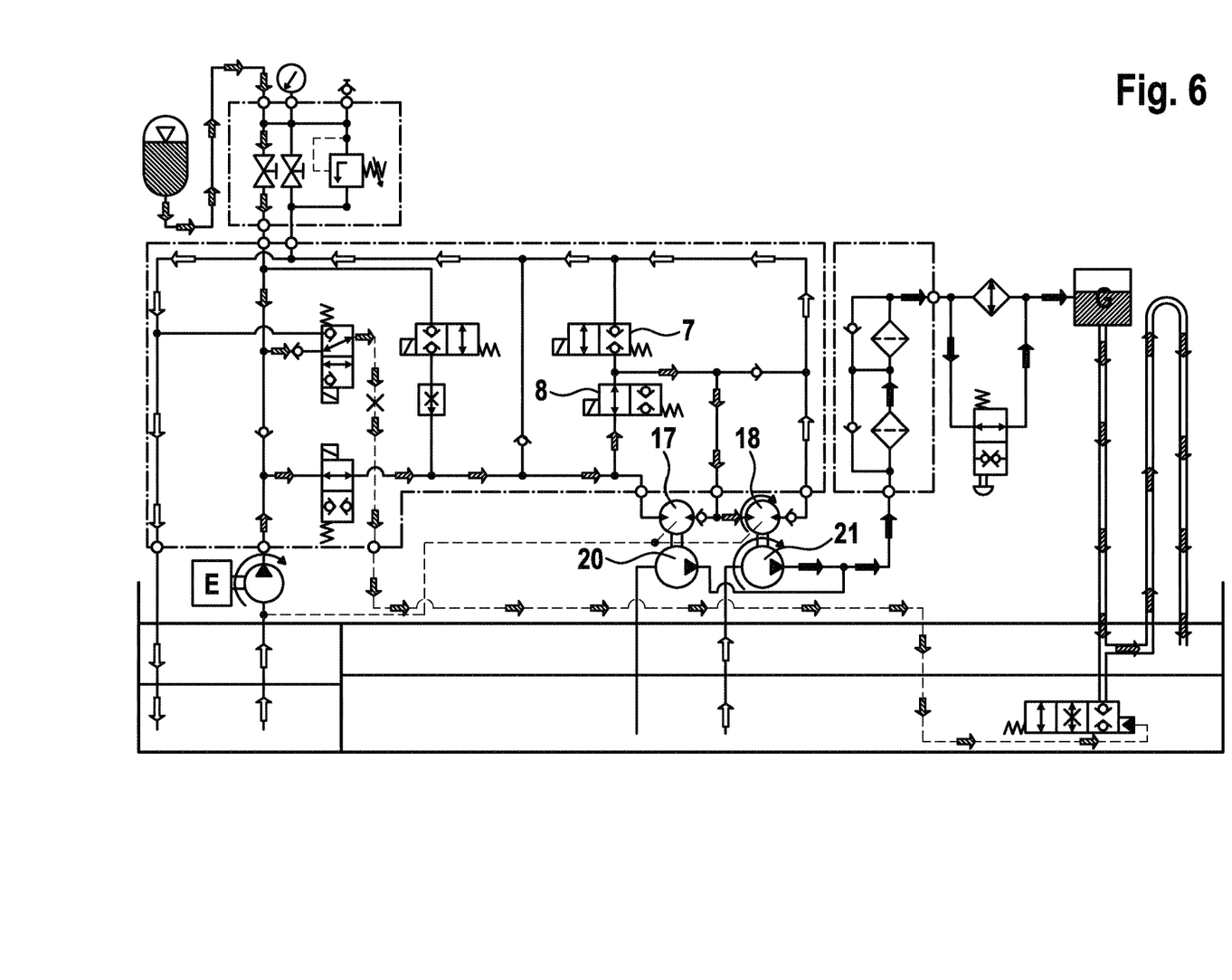
Figure 7:
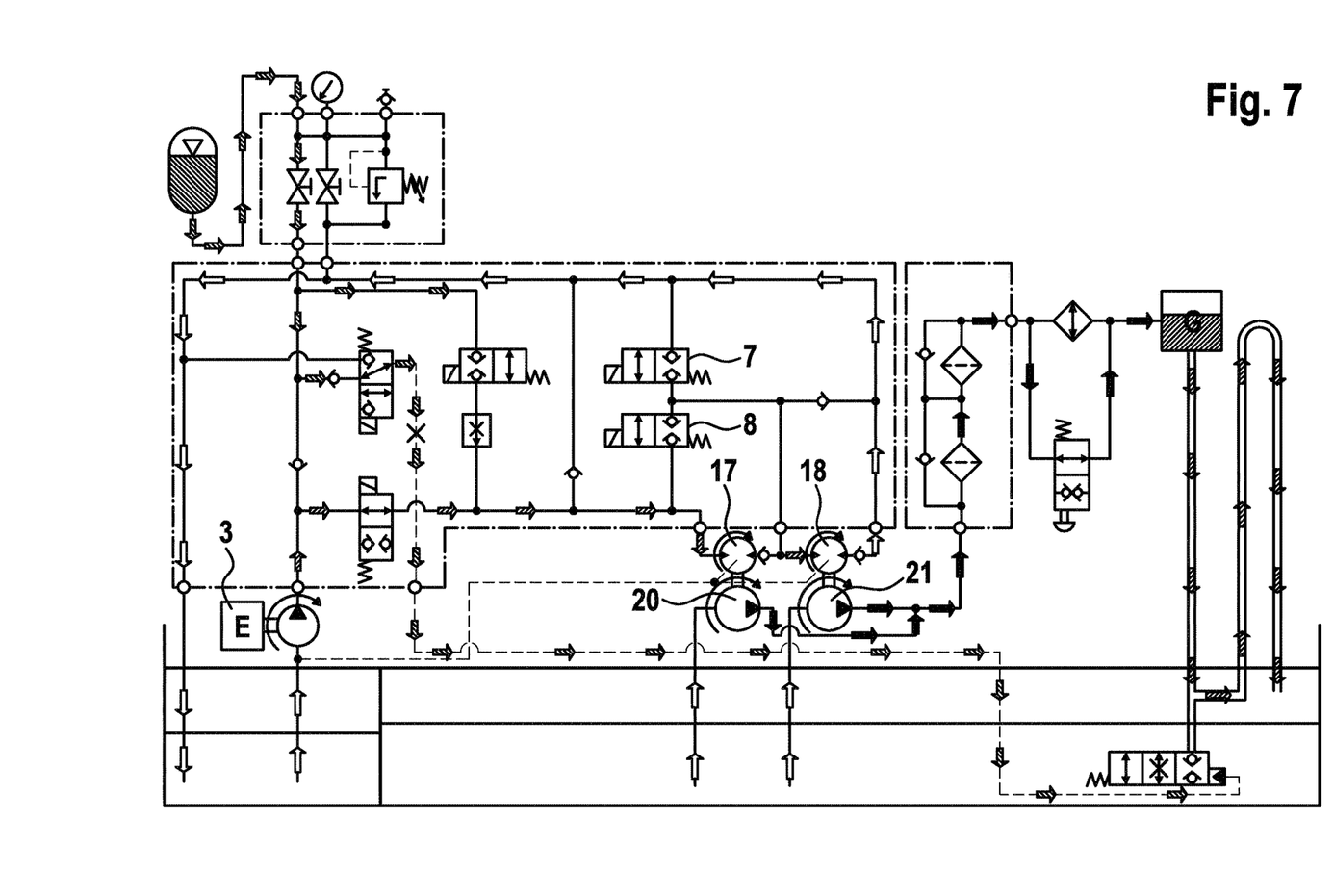

FIGS. 5, 6 and 7, described in the following, show how various volume flows can be generated in order to implement the wet sump in the transmission 29. In this case, for highly viscous, thick transmission oil and a high required torque, a small volume flow of the transmission oil is selected for the transmission oil pumps 20 and/or 21. In the case of very cold transmission oil and a correspondingly high torque requirement, it may be necessary to actuate only the drive that has the smallest delivery volume and, when the transmission oil is warmer, to switch off that drive and to actuate the next largest, in order to drive both drives 17, 18 simultaneously upon attainment of the desired temperature.

FIG. 5 relates to a first wet sump implementation, according to an exemplary embodiment of the present disclosure. It shows how the wet sump is implemented in the transmission 29.

Firstly, the valve 28 is closed. For this purpose, the 3/2-way valve 5 is switched into the position represented. As a result, hydraulic oil flows out of the pressure accumulator 16, via a node 40, the check valve 11, the 3/2-way valve 5 and a control line 50, to the closing valve 28, and closes the latter. The outflow of oil from the transmission 29 to the transmission oil tank 31 is interrupted. In this case, only a small quantity of hydraulic oil, which corresponds to the switching volume of the closing valve 28, flows out of the pressure accumulator 16. Since the pressure accumulator 16 is of a large volume because of its function of storing energy for an emergency, its pressure level, for example of 250 bar, scarcely drops in this case.

The pump 2 is then made to move by the electric motor 3 and, at the same time, the 2/2-way valves 4, 7 are switched into the position shown. This causes the hydraulic oil, conveyed out of the hydraulic oil tank 1 by the pump 2, to flow to the 3/2-way valve 4 via a node 41. It does not flow to the node 40 via the check valve 10, since the pressure level is greater there. From the 2/2-way valve 4, the hydraulic oil flows via a line 51 to the hydraulic motor 17, and drives the latter. The hydraulic oil flowing away from the hydraulic motor 17 flows, via the check valve 13 and the 2/2-way valve 7, to the hydraulic oil tank 1. The hydraulic motor 17, driven as described, drives the transmission oil pump 20 via a shaft. This pump conveys transmission oil, as indicated by arrows, via the coarse filter 25, the fine filter 24—and, in the case of cold transmission oil, bypassing the cooler 26—to the thermovalve 27, and via the latter to the transmission 29. The outflow of the transmission 29 is blocked by the closing valve 28, such that the transmission oil level rises equally both in the transmission 29 and in the riser pipe with the overflow 30, until the transmission oil in the riser pipe 30 reaches the overflow level and flows back into the transmission oil tank 31. The transmission 29 remains filled with the necessary, constant quantity of transmission oil, even with the transmission oil pump continuing to run. The wet sump is thereby implemented in the transmission 29.

According to an exemplary embodiment, in the operating state shown in FIG. 5 the transmission oil can likewise be heated by the heat put into the hydraulic oil, as described with reference to FIG. 4. For this purpose, the two tanks 1, 31 are disposed adjacently with a common wall, or in one another. Alternatively, the return leading into the tank 1 may be routed via a coiled tubing that is immersed in the tank 31.

FIG. 6 shows a second wet sump implementation according to an exemplary embodiment of the present disclosure. The switching position of the valves is as described with reference to FIG. 5, with the difference that the 2/2-way valve 7 is closed and the 2/2-way valve 8 is open. As a result, the hydraulic motor 18 and the transmission oil pump 21 are driven, and the hydraulic motor 17 and the transmission oil pump 21 are not driven.

FIG. 7 shows a third wet sump implementation according to an exemplary embodiment of the present disclosure. The switching position of the valves is as described with reference to FIGS. 5 and 6, with the difference that the directional control valve 7 and 8 are closed. As a result, the hydraulic motors 17, 18 and the transmission oil pumps 20, 21 are driven.

Figure 8:
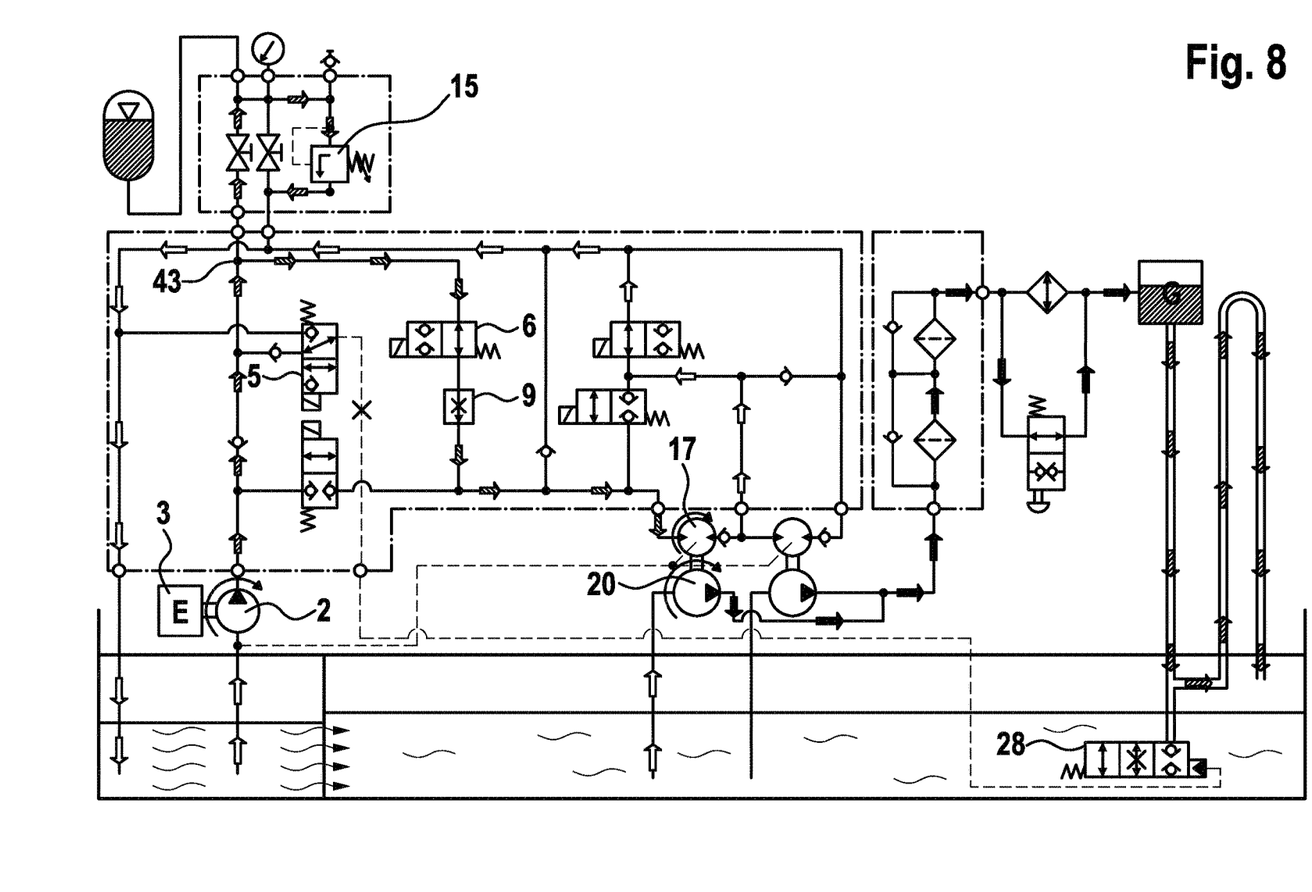

As can be seen from FIGS. 6, 7 and 8, if the hydraulic motors 17, 18 have the same and the transmission oil pumps 20, 21 have differing displacement volume capacities, three differing delivery rates can be set for the transmission oil. The converse also applies. A greatest possible spread of the three possible delivery rates can be achieved through differing displacement volumes of the hydraulic motors 17, 18 and of the transmission oil pumps 20, 21. Two times three, i.e. six, differing volume flows of the transmission oil can be generated if the electric motor 3 can be operated at two differing rotational speeds.

FIG. 8 shows a wet sump implementation and heating according to an exemplary embodiment of the present disclosure. It is described, with reference to FIG. 8, how the wet sump is implemented, with the hydraulic oil and the transmission oil being heated at the same time. The heating of the oil can be applied, not only in the implementing of the wet sump in the transmission 29, but also in the case of the normal conditions shown in FIG. 9. It always involves a reduction of the volume flow of the transmission oil.

The 3/2-way valve 5 is switched into the position shown. This causes the closing valve 28 to close, as described in FIG. 5. The volume flow leading to it is not represented, for reasons of clarity, but can be seen from FIG. 5. As soon as the closing valve 28 is closed, no further volume flow is required for it. The electric motor 3 then drives the hydraulic pump 2.

The volume flow generated by the hydraulic pump 2 flows to the node 43, where it branches. The partial volume flow, which drives the hydraulic motor 17 and the transmission oil pump 20, flows via the 2/2-way valve 6 to the flow regulating valve 9. The flow regulating valve 9 adjusts the volume flow to a fixed value, which is less than that of the hydraulic pump 2, and reaches the hydraulic motor 17 and drives the latter. The difference of the pump volume flow and of the volume flow driving the hydraulic motor 17 flows at the node to the pressure limiting valve 15, and opens the latter. The opening pressure, which corresponds to the set pressure of the pressure limiting valve 15, is the pressure that is present in all lines between the output of the hydraulic pump 2 and the pressure limiting valve 15 and the input of the hydraulic motor 17, and is, for example, 250 bar. The volume flow flowing to the pressure limiting valve 15 causes the oil to heat up.

According to an alternative exemplary embodiment, the flow regulating valve 9 is a variable valve, i.e., the volume flow via this valve 9 is steplessly adjustable. As a result, the heating power at the pressure limiting valve 15 and the rotational speed, and thus the volume flow of the hydraulic motor 17, can be adjusted steplessly. It is then the case that, the greater the heating power, the less is the rotational speed, and vice versa. The maximum available is the output of the electric motor 3.

Figure 9:
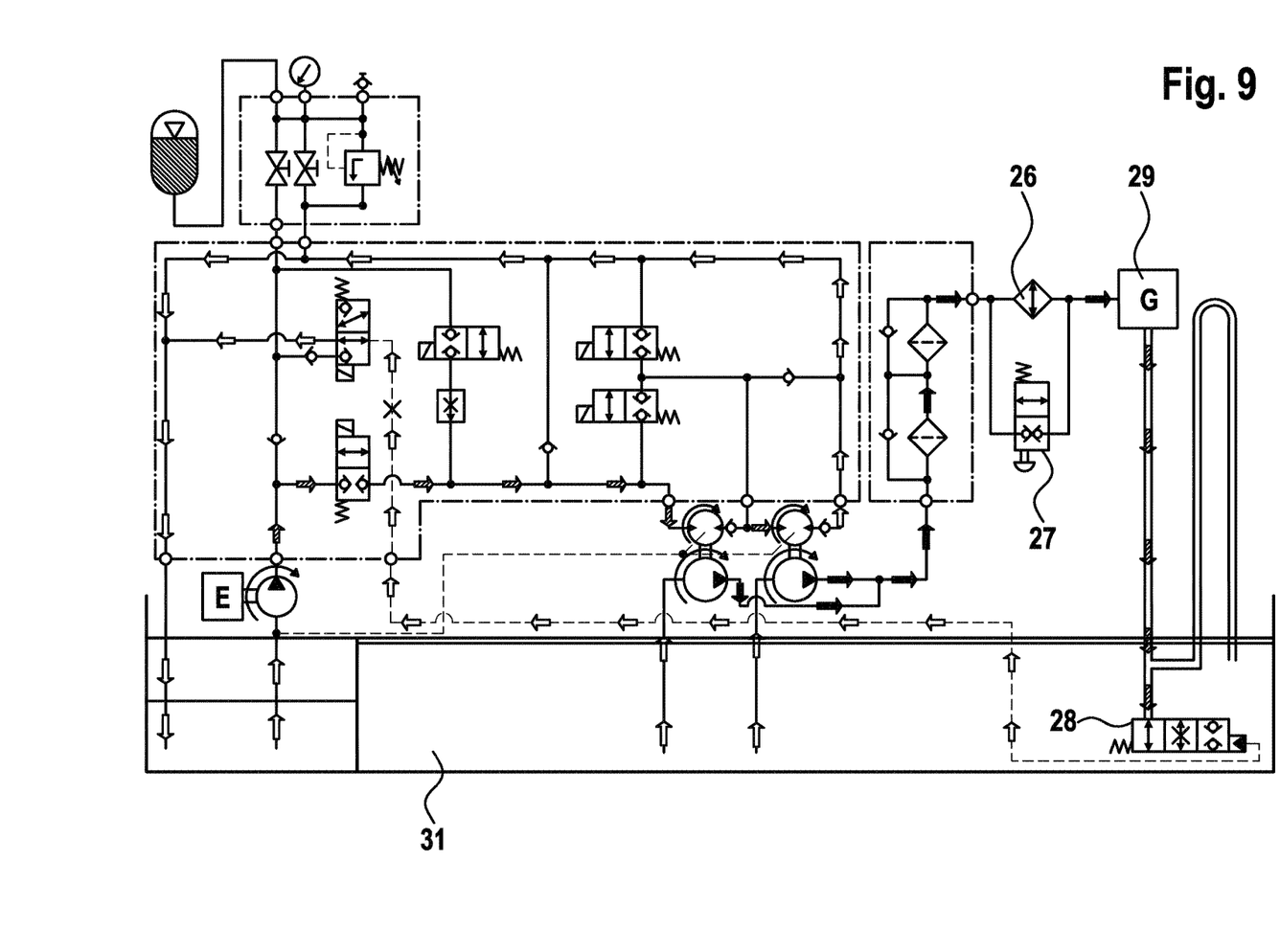

FIG. 9 represents the system in normal operation, according to an exemplary embodiment of the present disclosure. The valves are in the position shown. The transmission oil flows unimpeded from the transmission 29, via the closing valve 28, into the transmission oil tank 31. The thermovalve 27 is closed, i.e. the transmission oil flows with a maximum volume flow, via the cooler 26, to the transmission 29.

According to an exemplary embodiment, a typical functioning of a thermovalve is open up to 40° C., closing from 40° C. to 55° C., and closed from 55° C. Actuation may be effected by means of a bimetal. When this operating state is achieved, i.e. the cooler 26 is activated, the cooler 26 cools not only the transmission oil, but also the hydraulic oil.

Figure 10:
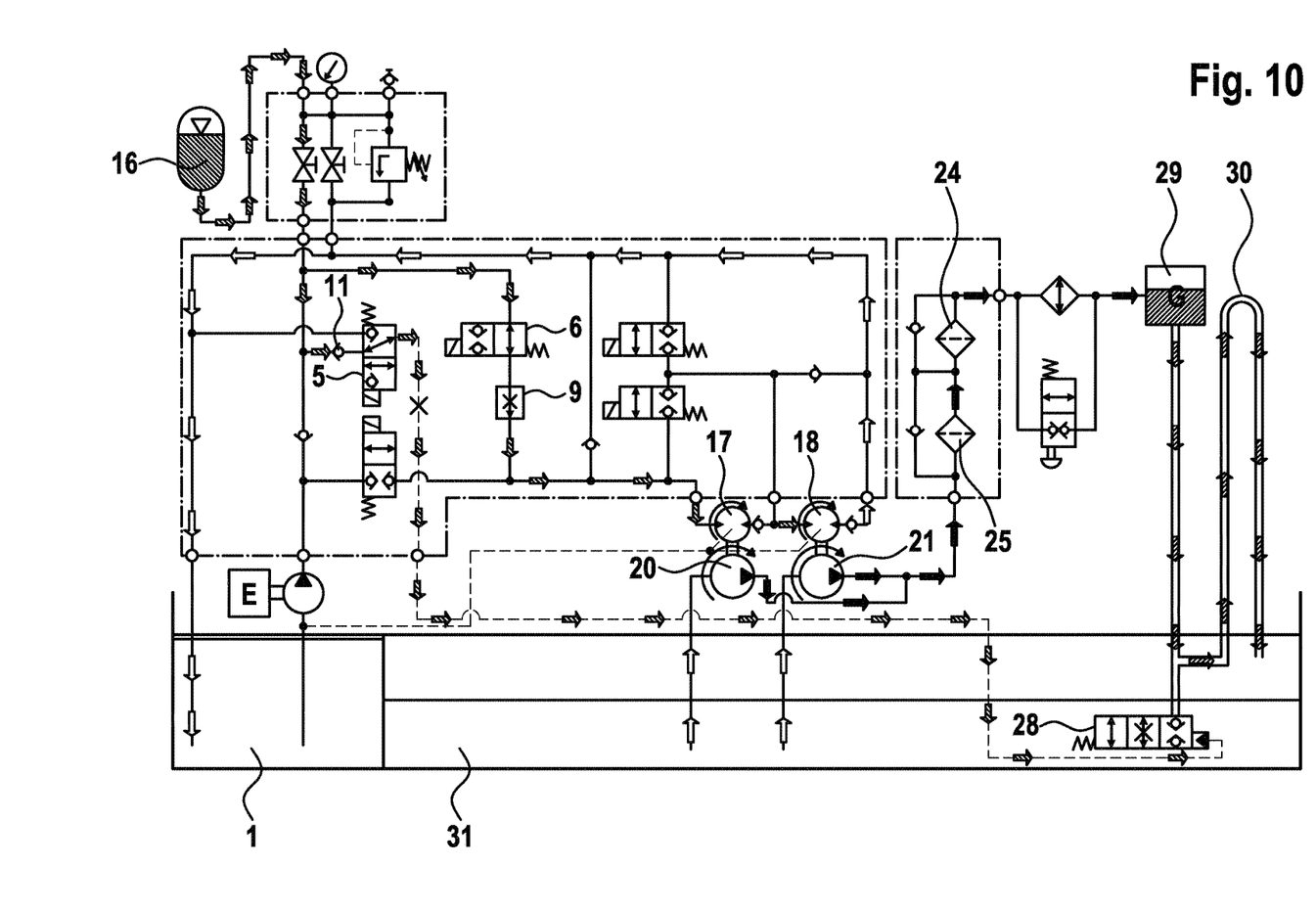

Represented in FIG. 10 is the emergency case, according to an exemplary embodiment of the present disclosure, such as that which arises, for example, as a result of an electric power outage. The valves switch into the position indicated. A small quantity of the pressure accumulator volume 16 flows, via the check valve 11 and the 3/2-way valve 5, to the closing valve 28, and causes the latter to close. The check valve 11 prevents the hydraulic oil from flowing back out of the closing valve 28, such that the closing valve 28 remains closed for as long as the 3/2-way valve 5 remains in the position shown.

The remaining quantity of the pressure accumulator volume 16 flows, via the 2/2-way valve 6 and the flow regulating valve 9, to the hydraulic motors 17, 18, and drives the latter. The hydraulic oil flowing away from the hydraulic motors 17, 18 flows to the hydraulic oil tank 1. The rotational speed of the hydraulic motors 17, 18 is limited and held constant by the flow regulating valve 9. The transmission oil pumps 20, 21 are driven by the rotation of the hydraulic motors 17, 18.

The displacement volume, which corresponds to the size of the transmission oil pumps 20, 21, is greater, by a factor of 10 to 15 times, than that of the hydraulic motors 17, 18, such that the movement of the hydraulic motors 17, 18 is effected with high pressure, while the movement of the transmission pumps 20, 21 is effected with low pressure, reduced by the same factor. The transmission oil pumps 20, 21 convey transmission oil out of the transmission oil tank 31, via the filters 25, 24, to the transmission 29.

The oil level in the transmission 29 rises until the level in the riser pipe 30 reaches the overflow 30. Transmission oil continuing to be supplied then flows to the transmission oil tank 31, the oil level in the transmission 29 in this case remaining constant. The process continues until the pressure accumulator 16 is empty.

According to an exemplary embodiment, the described approach is characterized by separate oil circuits for hydraulic and transmission oil, a common tank 1, 31, heating, cooling and an emergency drive. In emergency drive, the pressure accumulator 16 drives the elements 17, 20 and 18, 21. The indirect drive 2, 3 drives the elements 17, 20 and 18, 21. There is an overflow on the transmission 29.

Figure 11:
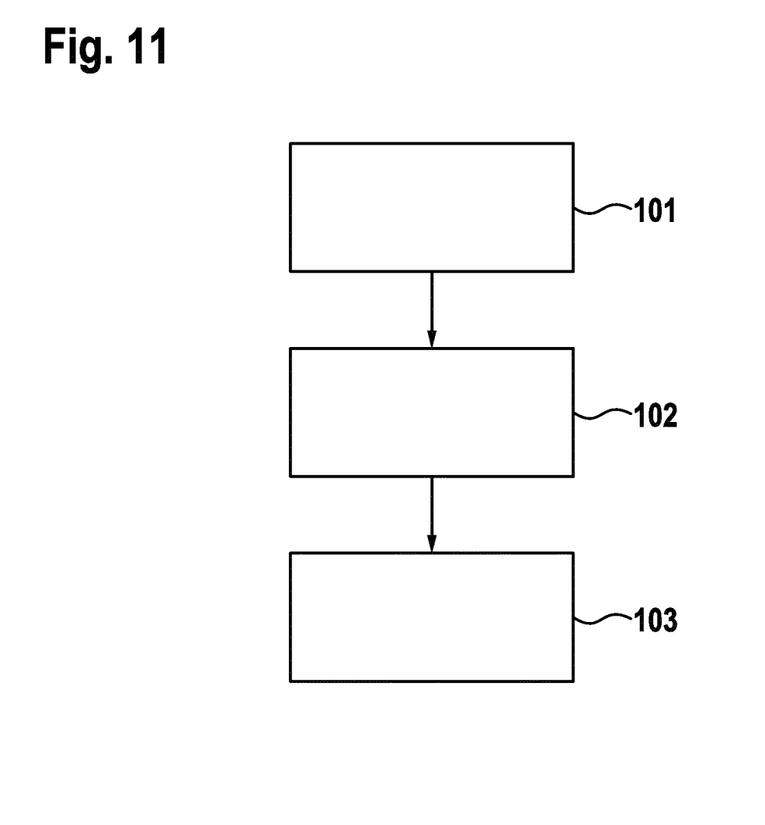
FIG. 11 a sequence diagram of a method for cooling and/or lubricating a transmission.

FIG. 11 shows a sequence diagram of a method for cooling and/or lubricating a transmission. The method may be implemented by the use of means of a cooling lubrication device described above.

The method comprises a step of storing 101 transmission oil for the transmission in a transmission oil tank, a step of storing 102 hydraulic oil in a hydraulic oil tank, and a step of conveying 103 the transmission oil to the transmission 29 by the use of a transmission oil conveying means driven by means of the hydraulic oil.

In the figures that follow, elements that are the same or similar may be denoted by the same or similar references. Furthermore, the figures of the drawings, the description thereof and the claims contain numerous features in combination. Persons skilled in the art are aware that these features may also be considered singly, or that they may be combined to form further combinations that are not explicitly described here.

LIST OF REFERENCES

1 hydraulic oil tank
2 hydraulic pump
3 electric motor
4 2/2-way valve
5 3/2-way valve
6 2/2-way valve
7 2/2-way valve
8 2/2-way valve
9 flow regulating valve
10 check valve
11 check valve
12 check valve
13 check valve
14 check valve
15 pressure limiting valve
16 pressure accumulator
17 hydraulic motor
18 hydraulic motor
20 transmission oil pump
21 transmission oil pump
22 check valve
23 check valve
24 fine filter
25 coarse filter
26 cooler
27 thermovalve
28 closing valve
29 transmission
30 riser pipe with overflow
31 transmission oil tank
101 storing transmission oil
102 storing hydraulic oil
103 conveying the transmission oil

The invention claimed is:

1. A cooling lubrication device for a transmission for a wind turbine, comprising:
   a transmission oil tank configured to store transmission oil for the transmission;
   a transmission oil line system configured to carry the transmission oil between the transmission oil tank and the transmission;
   a hydraulic oil tank configured to store hydraulic oil;
   a hydraulic oil line system configured to carry the hydraulic oil;
   a hydraulic oil conveying device configured to convey the hydraulic oil through the hydraulic oil line system;
   an energy accumulator configured to maintain, at least temporarily, a pressure within the hydraulic oil line system, the energy accumulator chargeable by the hydraulic oil conveyed by the hydraulic oil conveying device; and
   a transmission oil conveying device coupled to the hydraulic oil line system and the transmission oil line system, and configured to be driven by the hydraulic oil to convey the transmission oil to the transmission.

2. The cooling lubrication device as claimed in claim 1, wherein the hydraulic oil line system is configured to drive the transmission oil conveying device in a normal operating mode with by the hydraulic oil conveying device and, in an emergency operating mode with energy from the energy accumulator.

3. The cooling lubrication device as claimed in claim 1, wherein the transmission oil conveying device includes a hydraulic motor configured to be driven by the hydraulic oil, and a transmission oil pump configured to be driven by the hydraulic motor and to convey the transmission oil.

4. The cooling lubrication device as claimed in claim 3, wherein:
   the transmission oil conveying device includes a further hydraulic motor configured to be driven by the hydraulic oil, and a further transmission oil pump configured to be driven by the further hydraulic motor and to convey the transmission oil,
   the transmission oil pump and the further transmission oil pump are disposed parallel to each other in the transmission oil line system, and
   a positioning device is disposed in the hydraulic oil line system and is configured to enable, optionally, the hydraulic motor, the further hydraulic motor, or both hydraulic motors to be driven by the hydraulic oil.

5. The cooling lubrication device as claimed in claim 1, further comprising:
   a blocking device disposed in the transmission oil line system and configured to release or block a backflow of the transmission oil from the transmission to the transmission oil tank,
   wherein a control input of the blocking device is coupled to the hydraulic oil line system.

6. The cooling lubrication device as claimed in claim 5, further comprising:
   an overflow device configured to route the transmission oil past the blocking device in order to limit a quantity of the transmission oil present within the transmission.

7. The cooling lubrication device as claimed in claim 1, wherein:
   the hydraulic oil tank and the transmission oil tank have a common dividing wall, and
   the common dividing wall has a high thermal conductivity.

8. The cooling lubrication device as claimed in claim 1, wherein:
   the hydraulic oil tank and the transmission oil tank are realized separately from each other, and
   at least one line of the hydraulic oil line system is routed through the transmission oil tank.

9. The cooling lubrication device as claimed in claim 1, wherein the hydraulic oil tank is disposed inside the transmission oil tank.

10. The cooling lubrication device as claimed in claim 1, further comprising:
   a pressure limiting valve configured to route the hydraulic oil past the energy accumulator when the energy accumulator is full, such that the energy accumulator heats the hydraulic oil.

11. The cooling lubrication device as claimed in claim 1, wherein the transmission oil line system includes a first line configured to carry the transmission oil from the transmission oil tank to a first transmission oil input of the transmission oil conveying device a second line configured to carry the transmission oil from the transmission oil tank to a second transmission oil input of the transmission oil conveying device, a third line configured to carry the transmission oil from a first transmission oil output and a second transmission oil output of the transmission oil conveying device to the transmission, and a fourth line configured to carry the transmission oil from the transmission to the transmission oil tank.

12. The cooling lubrication device as claimed in claim 1, in which wherein the hydraulic oil line system has a first line configured to connect the hydraulic oil tank to the hydraulic oil conveying device, a second line configured to connect an output of the hydraulic oil conveying device to an input of a 2/2-way valve, the output of the hydraulic oil conveying device, via check valves, to a first input of a 3/2-way valve, the output of the hydraulic oil conveying device, via the check valve, to an input of a 2/2-way valve, the output of the hydraulic oil conveying device, via a 2/2-way valve, a 2/2-way valve and a shut-off valve, to a connection of the energy accumulator, and the output of the hydraulic oil conveying device, via the shut-off valve, to an input of the pressure limiting valve, a third line configured to connect an output of the pressure limiting valve to a return line for returning the hydraulic oil into the hydraulic oil tank, a fourth line configured to connect an output of the 2/2-way valve to an input of the transmission oil conveying device the output of the 2/2-way valve, via a check valve, to the return line, and the output of the 2/2-way valve to an input of the a 2/2-way valve, a fifth line configured to connect an output of the 2/2-way valve, via a flow regulating valve, to the input of the transmission oil conveying device, a sixth line configured to connect an output of the 2/2-way valve to an input of the 2/2-way valve, a seventh line configured to connect an output of the 2/2-way valve to the return line, an eighth line configured to connect an output of the transmission oil conveying device, via a check valve, to a further input of the transmission oil conveying device, the output of the transmission oil conveying device to the input of the 2/2-way valve, and the output of the transmission oil conveying device, via a check valve, to the return line, and a ninth line, configured to connect an output of the transmission oil conveying device, via a check valve, to the return line.

13. A method for cooling and/or lubricating a transmission for a wind turbine, comprising:
   storing transmission oil for the transmission in a transmission oil tank;
   storing hydraulic oil in a hydraulic oil tank; and
   conveying the transmission oil to the transmission using a transmission oil conveying device driven by the hydraulic oil.

* * * * *

UNITED STATES PATENT AND TRADEMARK OFFICE
CERTIFICATE OF CORRECTION

PATENT NO. : 10,145,463 B2
APPLICATION NO. : 15/031302
DATED : December 4, 2018
INVENTOR(S) : Doertoluk et al.

Page 1 of 1

It is certified that error appears in the above-identified patent and that said Letters Patent is hereby corrected as shown below:

In the Claims

1: In Column 10, Lines 25-26, Lines 3-4 of Claim 2 should read:
the transmission oil conveying device in a normal operating
mode with the hydraulic oil conveying device and, in an 2: In Column 11, Lines 29-30, Lines 1-2 of Claim 12 should read:
12. The cooling lubrication device as claimed in claim 1,
wherein the hydraulic oil line system has a first line Signed and Sealed this
Fourteenth Day of May, 2019

Andrei Iancu
*Director of the United States Patent and Trademark Office*